Dec. 11, 1928.
C. L. BURDICK
1,694,370
REFRIGERATING AND HEAT INTERCHANGING APPARATUS
Filed Nov. 21, 1925     2 Sheets-Sheet 1
Fig.1.
Fig.2.
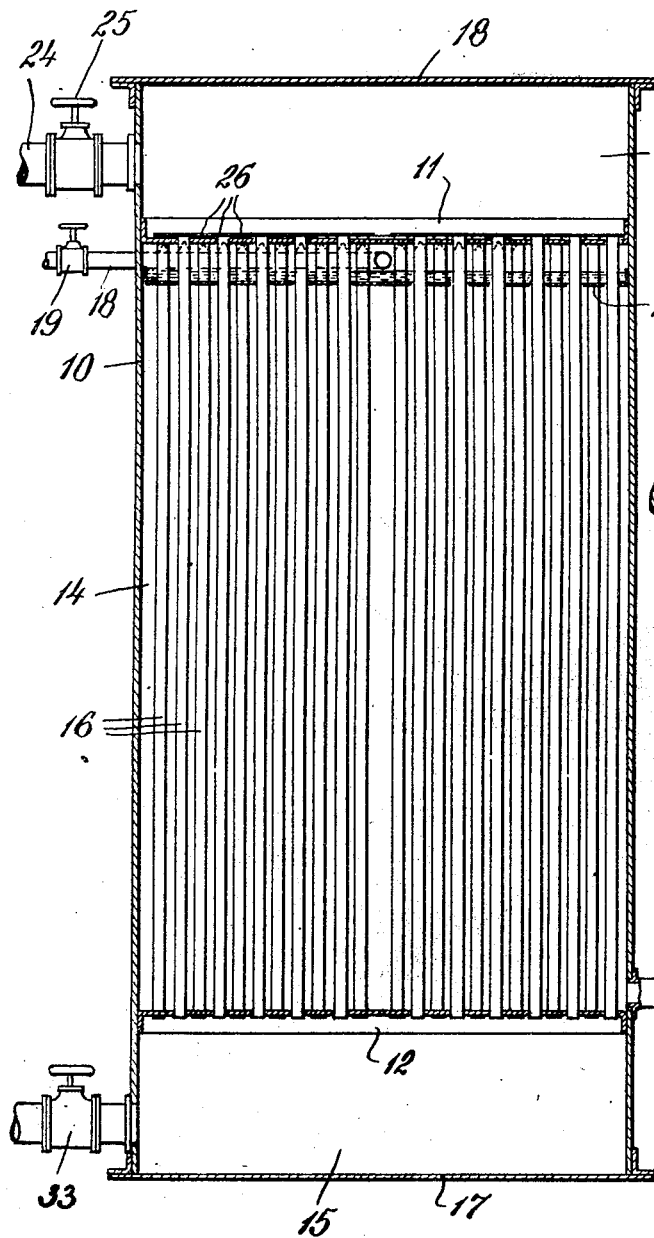
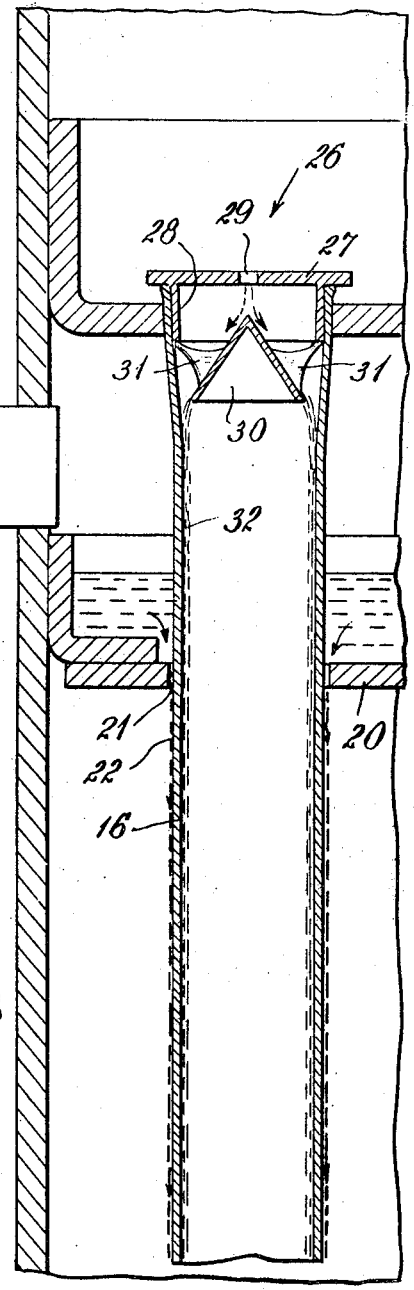
INVENTOR
Charles L. Burdick
BY
Pennie, Davis, Marvin & Edmonds
ATTORNEYS Dec. 11, 1928.  1,694,370
C. L. BURDICK
REFRIGERATING AND HEAT INTERCHANGING APPARATUS
Filed Nov. 21, 1925  2 Sheets-Sheet 2
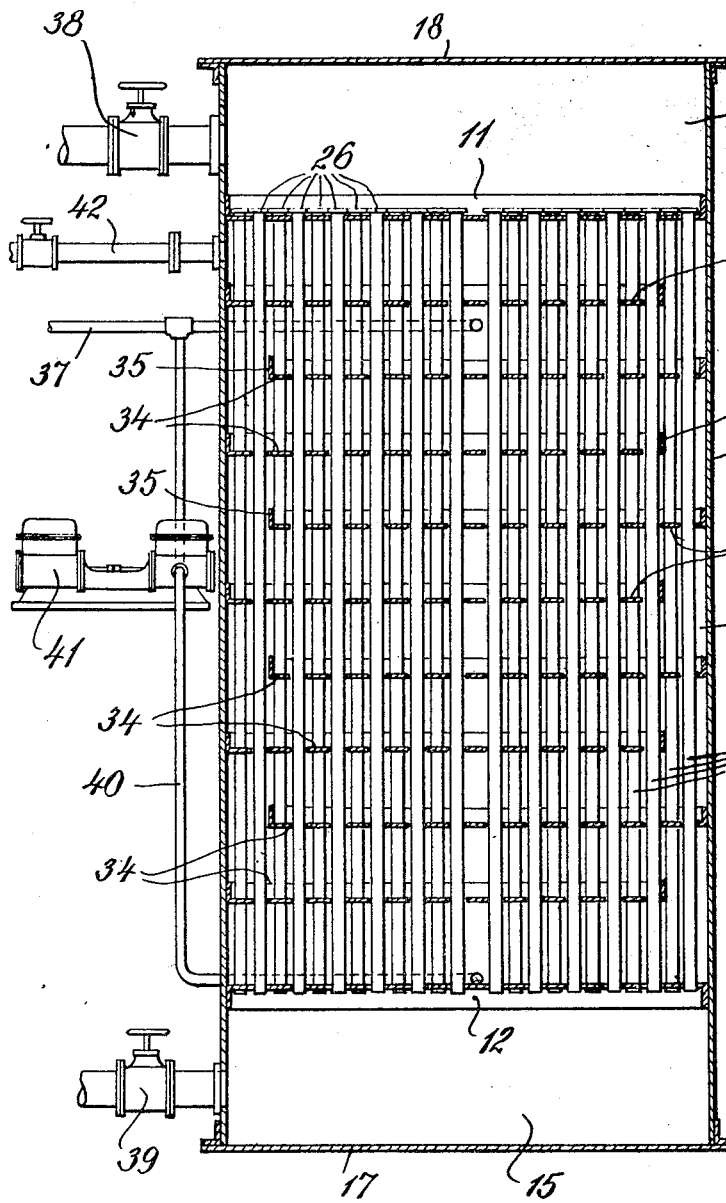
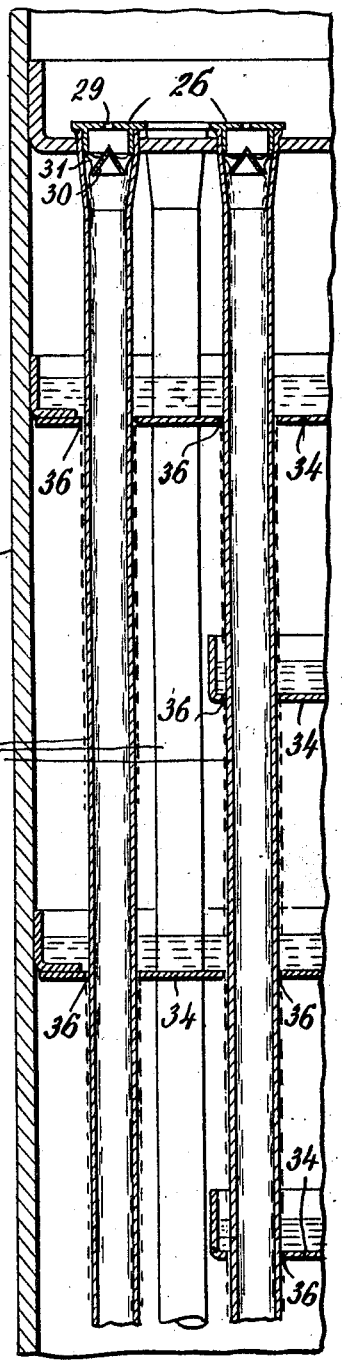
INVENTOR
Charles L. Burdick
BY
ATTORNEYS Patented Dec. 11, 1928.

1,694,370

UNITED STATES PATENT OFFICE.

CHARLES LALOR BURDICK, OF NEW YORK, N. Y.

REFRIGERATING AND HEAT-INTERCHANGING APPARATUS.

Application filed November 21, 1925. Serial No. 70,512.

This invention relates to apparatus for interchanging heat between liquids and has for its object the provision of a heat interchanging apparatus of improved construction.

Difficulty has been experienced in the past in so constructing apparatus for interchanging heat between liquids as to secure a sufficiently high rate of heat transfer with an apparatus occupying a given amount of space, and as well in building the apparatus at a relatively low first cost. Also in many of the prior installations the operating and maintenance costs have been excessive. Among the more important factors concerned in the operation of a heat exchanging apparatus which affect the attainment of the desired results are the heat conductivity of the separating medium, the velocity at which the liquids are moved over the surfaces of this medium, and the viscosity of the liquids dealt with.

The importance of high heat conductivity has always been recognized and wherever it is possible to do so, materials, such for example as copper, are employed for the separating medium. Provision for appropriate velocity conditions and for securing rapid heat transfer with viscous as well as mobile liquids, however, presents a more difficult problem.

In building heat interchanging apparatus of the type in question, it is usual to make the separating medium in the form of one or more tubes or conduits, the exterior of the tubes being submerged in a body of one of the liquids and the other liquid being passed through their interior. Assuming the apparatus to be used for refrigeration with the liquid to be cooled passing through the interior of the tubes, when a solid column of liquid is passed through the tubes in accordance with the prior practice, the liquid at the center of the column either gives up extremely little heat, or else is cooled inefficiently because the relatively thin layer of liquid at relatively low velocity in contact with the interior surface of the tube acts as a heat insulator. This is particularly true when oil is the liquid which it is desired to cool.

A further source of loss in the operation of such heat exchangers occurs on account of the fact that the liquid at the center of each tube constitutes a large percentage of the total liquid in the tube and it is necessary to force this relatively large amount of substantially unaffected liquid through the tubes of the apparatus. The amount of power consumed in this manner is considerable and is increased when attempts have been made, as in the past to improve the heat transfer conditions by varying the cross sections of the tubes as for example by flattening.

According to the present invention the two liquids between which it is desired to interchange heat are continuously maintained in the form of a film, or relatively thin layer, one on each side of the separating medium. Thus a separating medium in the form of a tube is employed having one end higher than the other so that liquid will flow through it by gravity. Means are provided for continuously maintaining a film of one of the liquids on the exterior surface of this tube and for continuously maintaining a film of the other liquid on the interior surface of the tube. In the preferred form of my improved apparatus a plurality of tubes arranged in the vertical position, or approximately so, are employed and means are provided for discharging one of the liquids onto the exterior surface of the tubes in thin annular streams which flow rapidly downwardly over each tube. Means are also arranged to discharge a thin annular stream of the other liquid into the interior of the upper end of each of the tubes. These thin streams of the two liquids flow rapidly down their respective surfaces of the tubes by gravity and during this passage the interchange of heat between them takes place. This interchange is thus accomplished under extremely effective conditions inasmuch as the two streams are separated only by the relatively thin walls of the tubes which are composed of good heat conducting material, such for example as copper or steel depending upon the nature of the materials to be treated.

Because of the fact that the flow of each of the liquids takes place in the form of a film or relatively thin stream the only propelling force required is that of gravitation. There is no opportunity for the formation of eddy currents in the center of the conduits as in the case of a solid column of liquid being forced through a conduit under pressure. The present invention is applicable not only to the interchange of heat between two liquids which remain in the liquid condition, but also it may be advantageously employed when one of the liquids undergoes vaporization during the heat transfer, as for example, in the cooling of brine in an ice or refrigeration plant by the vaporization of liquid ammonia. In this case the brine is preferably discharged onto the interior surface of the tubes in the form of a film or thin stream as before, and means are provided for maintaining a film of the liquid undergoing vaporization on substantially the entire exterior surface of the tubes. For this purpose the liquid undergoing vaporization is distributed in a plurality of zones spaced one above the other, as for example by means of a plurality of vertically spaced trays each of which is provided with outlets for discharging a thin annular stream of liquid onto the exterior of each of the tubes. In this case also it is important to enclose the plurality of tubes in a chamber so as to collect the vaporized liquid and return it to another portion of the plant to be again liquefied.

The invention will be better understood by referring to the accompanying drawings which illustrate by way of example the complete apparatus of each type in the preferred form.

In these drawings

Fig. 1 is a vertical section through the apparatus as constructed, for the purpose of interchanging heat between two liquids both of which remain in the liquid form during the heat transfer.

Fig. 2 is an enlarged fragmentary vertical section taken through one of the tubes to illustrate the details of the liquid distributing devices.

Fig. 3 is a vertical section of an apparatus for use with two liquids one of which undergoes vaporization during the heat interchange, and Fig. 4 is an enlarged fragmentary section showing the liquid distributing means of the apparatus of Fig. 3.

Referring first to Fig. 1 of the accompanying drawings, there is here shown a tank 10 having a pair of headers 11 and 12 spaced respectively from the top and bottom of the tank. These headers therefore form three chambers, the upper chamber 13, the intermediate chamber 14 and the lower chamber chamber 15. A plurality of tubes 16 extend vertically between the headers 11 and 12 within the intermediate chamber 14 and the interiors of each of these tubes are in free communication with the upper chamber 13 and the lower chamber 15. Lower chamber 15 is closed at the bottom by means of a plate 17 upon which the tank rests but the upper chamber 13 may be left open or, as shown in Fig. 1, provided with a cover 18. This cover may be loosely held in place and used merely for the exclusion of foreign matter, or it may be secured tightly in place depending upon the manner in which the apparatus is employed as will be seen later.

One of the liquids undergoing treatment is fed through a supply pipe 18 under the control of valve 19 onto a tray or diaphragm 20 which is placed near the top of intermediate chamber 14. This tray 20 has a rim 35 around its edges to maintain a pool of liquid thereon and is also perforated for the passage therethrough of each of the tubes 16 with openings 21 (see Fig. 2) slightly larger in diameter than the diameter of the tubes 16. Through the annular outlets thus provided and under the head of liquid in the pool on the tray the liquid flows from the tray 20 in the form of a film or relatively thin annular stream which passes down over the entire exterior surface of each of the tubes 16. This liquid is collected on the top of bottom header 12 and withdrawn through the valve controlled outlet 23.

The other liquid enters upper chamber 13 of the apparatus through conduit 24 under the control valve 25. The upper end of each of the pipes 16 is provided with a liquid distributing device 26. This device comprises a cap member 27 having a depending collar 28 by which it is removably held within the tube 16. Packings may be inserted between collar 28 and the interior of the upper end of the tube if desired for the purpose of securing a tight joint and to prevent the collar from sticking. An aperture 29 passes through the center of cap 27 and vertically below this aperture a cone shaped member 30 is suspended by preferably three web members 31 which are attached to the collar 28.

The liquid entering chamber 13 passes through apertures 29 in each of the distributing devices 26 and is deflected by means of the cone shaped members 30 as shown by the arrows in Fig. 2 against the interior walls of the tubes 16 in the form of a film or thin annular stream 32. These streams pass out of the lower ends of the tubes 16 into the lower chamber 15 and the liquid collecting therein takes its exit from the apparatus through the valve 33.

In feeding the liquid to the upper chamber 13 valve 25 is regulated so as to maintain a relatively small head of liquid above the distributing device 26 so that the liquid passes through the apertures 29 entirely under the influence of gravitation. In this case cover 18 need only be loosely held in place or may be omitted entirely. However, if it is desired to do so, the cover 18 may be firmly secured to the tank 10 and liquid fed to chamber 13 under pressure.

The two concentric annular streams or films of liquid passing simultaneously down the opposite surfaces of the tubes 16 interchange heat between them in a most effective manner because of the high velocity in the films and the very intimate contact of all the liquid with the tubes. Substantially all of the heat represented by the difference in temperatures between the two liquids less the amount of heat which is absorbed by conduction to the tubes of wall 16 is transferred from one liquid to the other. Either the warmer or the cooler liquid may be caused to pass through the interior of the tubes. If either of the liquids have any tendency to cause unavoidable deposits of scally material upon the surface of the tubes it is convenient to pass such liquid through the interior of the tubes because in that case the tubes may be very readily cleaned of their scale. This is accomplished by removing the cover 18 and each of the distributing devices 26 and then introducing some convenient form of tube cleaner.

Referring now to Figs. 3 and 4 of the accompanying drawings which illustrate the apparatus of the invention when modified to effect the transfer of heat between two liquids one of which is undergoing vaporization, the general arrangement of the apparatus is similar to that of Figs. 1 and 2. The tank 10, upper and lower headers 11 and 12, upper and lower chambers 13 and 15, and the arrangement of the tubes 16 extending between the headers is exactly the same as shown in Fig. 1. The liquid distributing devices 26 for delivering liquid in the form of films or thin annular streams to the interiors of the tubes 16 are also constructed as shown in Fig. 2 and mounted in the upper ends of the tubes 16 the same as in the apparatus of Fig. 1.

The means for continuously maintaing the films of liquid undergoing vaporization on the exterior surfaces of the tubes are however, subject to some modification. Thus as is illustrated in Fig. 3 there are provided a plurality of transverse trays or diaphragms 34 which are vertically spaced from the top to the bottom of the intermediate chamber 14 between the headers 11 and 12. Each of these headers is provided with a rim 35 by which a pool of liquid of substantial depth may be maintained therein, and the several trays are provided with perforations 36 for each of the tubes 16 the perforations 36 being slightly larger in diameter than the diameter of the tubes. In this way annular streams of liquid from the pools which are maintained on each of the trays are discharged onto the exterior surfaces of the tubes 16. The liquid undergoing vaporization, such for example as ammonia is fed into the apparatus through pipe 37 which discharges onto the uppermost tray 34. A considerable quantity of excess liquid is discharged onto this tray and overflows the rim 35 onto the next tray below. An excess of liquid is discharged from each of the rims 35 of the successive trays 34 and thus pools of liquid are maintained on each of these trays throughout the stack.

The liquid passing down in the annular streams through the openings 36 undergoes vaporization as heat is transferred to it from the liquid being cooled which in this case it is preferable to pass through the interiors of the tubes 16 and which is therefore fed to the upper chamber 13 through the control valve 38. By means of the spaced trays 34 liquid undergoing vaporization is fed to the surfaces of the tubes 16 in a plurality of vertically spaced zones. The liquid to be cooled after passing down through the tubes 16 in the film-like formations collects in the lower chamber 15 and passes out through the valve controlled outlet 39.

Inasmuch as it is desirable to maintain an excess of liquid undergoing vaporization on the surfaces of all of the trays 34; a certain amount of this liquid will collect on the top of the bottom header 12 and provision is made for removing this excess liquid by means of pipe 40. Pipe 40 leads to a lifting device 41 which returns the liquid to the supply pipe 37.

The vaporized liquid within the intermediate chamber 14 passes in a circuitous path past the rims 35 of the trays which are spaced in staggered relation from the side walls of the tank for this purpose, and rising toward the top of chamber 14 is withdrawn therefrom through the pipe 42. In order to prevent entrained globules of unvaporized liquid from being drawn out through pipe 42 a deflector 43 is provided just above the supply pipe 37 and which can conveniently be constructed in the same manner as the trays 34. This deflector increases the length of travel of the vaporized refrigerant from the discharge end of supply pipe 37 to the entrance to discharge pipe 42.

In the operation of the apparatus the liquid being discharged to the interior surface of the tubes in the form of a film flows downwardly along this surface without interruption other than that caused by friction, there being no opportunity for the building up of a back pressure caused by eddy currents as is common when a solid column of liquid is forced through a tubular conduit. The flow of the liquid on the exterior of the tube takes place under similar conditions. Furthermore, the transfer of heat is effected directly through the walls of the tubes 16 from one film of heat-giving liquid to another film of heat-absorbing liquid. When it is desirable, an adjustment of the thickness of the annular streams on the exterior and interior respectively is made so that the entire available heat corresponding to the difference of temperature between the liquids will be transferred from one stream to the other. Inasmuch as only an annular stream of liquid is present within the tubes, the liquid in this stream is heated or cooled to a maximum or minimum temperature, as the case may be, because the absence of the core of liquid within the annular stream takes away the opportunity for a transfer of heat from the annular stream to this relatively large core or body of liquid.

The equipment for using a vaporizing refrigerant differs from the equipment using a non-vaporizing refrigerant in that the equipment using a vaporizing refrigerant must have a gas tight chamber between the tube headers. In the case of the non-vaporizing refrigerant, this gas tight chamber between the headers is optional depending on the temperature, vapor pressure and value of the fluid on the outside of the tubes.

Also, for the best operation of the equipment using a vaporizing refrigerant, the trays or headers are preferably to be so spaced apart vertically that the quantity of vaporizing refrigerant which can pass through the annular openings around the conduits will not be completely vaporized before it can reach the next tray below or the lower end of the conduits. If the annular opening around the conduits and the length of the conduits are such that a sufficient amount of vaporizing refrigerant can pass through the annual opening so as to supply the full length of the conduit with a film, one top tray is satisfactory. If the length of the conduits is such that a sufficient amount of vaporizing refrigerant does not pass through the annular opening around the conduits so as to provide a film of vaporizing refrigerant the full length of the conduits then a plurality of trays is preferable. In one form of the invention the trays are preferably provided with segmented openings arranged in a staggered manner so that the segmental openings on successive trays are opposite hand thus allowing the vaporizing refrigerant in excess of that which passes through the annular openings of the first tray to flow over the edge of the segmental openings to the next lower tray.

The length of the conduits can also be so proportioned so as to enable a sufficient quantity of vaporizing refrigerant to be supplied to the inside of the conduits and maintain a film of vaporizing refrigerant the full length of the inside of the conduits. This arrangement of the invention necessitates there being a gas tight chamber connected to the inside of the tubes in a manner similar to the connections shown in the attached drawings on the gas tight chamber around the outside of the tubes.

When a non-vaporizing refrigerant is used it can be supplied to either the inside or the outside of the tubes. Since there will be no vaporization there will be no loss of liquid from the films and the top tray will supply a sufficient amount of non-vaporizing refrigerant to run the whole length of the tube.

Thus, by constructing the apparatus in accordance with the principles of the present invention the transfer of heat is so effectively made that the size of the apparatus for a given installation is relatively small, thus reducing its weight and first cost. What is more important in many cases is the fact that the flow of both liquids through the apparatus by gravity removes the necessity of operating relatively large pumps which require a considerable amount of power for the purpose of causing the circulation of the liquids through the apparatus.

I claim:

1. In an apparatus for interchanging heat between two liquids, a plurality of tubes for separating said liquids having one end higher than the other so that liquid will flow through by gravity, means for discharging one of said liquids in an annular stream onto the exterior of each of said tubes, and means including an apertured cap fitted into the upper end of each of said tubes and supporting a cone-shaped member within the tube to receive liquid passing through the aperture in the cap and discharge it in an annular stream onto the interior surface of the tube.

2. In an apparatus for interchanging heat between two liquids, a tank having a pair of headers spaced respectively from the top and bottom thereof and forming an upper, a lower and an intermediate chamber, a plurality of vertical tubes extending between the headers through the intermediate chamber and having their interiors communicating with the upper and lower chambers, a transverse tray within the intermediate chamber near the top thereof, said tray having perforations for each of said tubes for delivering an annular stream of liquid onto the exterior of each tube, means for supplying liquid to said tray, means for withdrawing said liquid from the bottom of the intermediate chamber, an apertured cap for the end of each tube in the upper chamber and a cone-shaped member disposed below said aperture for directing the liquid passing through the aperture in an annular stream against the interior surface of the tube, means for supplying liquid to the upper chamber, and means for withdrawing said liquid from the lower chamber.

3. In an apparatus for interchanging heat between two liquids one of which is undergoing vaporization, a plurality of tubes for separating said liquids having one end higher than the other so that liquid will flow through by gravity, means for distributing the liquid undergoing vaporization on the exterior surfaces of the tubes in a plurality of spaced vertical zones, means for distributing the other liquid in a film on the interior surfaces of said tubes, and means for collecting the vaporized liquid.

4. In an apparatus for interchanging heat between two liquids one of which is undergoing vaporization, a plurality of tubes for separating the liquids having one end higher than the other so that liquid will flow through by gravity, means for discharging liquid undergoing vaporization in a thin annular stream on the exterior of each tube at spaced intervals from the top to the bottom thereof, means for distributing the other liquid in a film on the interior of each of said tubes, and means for collecting the vaporized liquid.

5. In an apparatus for interchanging heat between two liquids one of which is undergoing vaporization, a plurality of tubes for separating the liquids having one end higher than the other so that liquid will flow through by gravity, means for discharging the liquid undergoing vaporization in a thin annular stream on the exterior of each tube at spaced intervals from the top to the bottom thereof, means including a cone-shaped member for directing a thin annular stream of the other liquid onto the interior surface of each tube, and means for collecting the vaporized liquid.

6. In an apparatus for interchanging heat between two liquids one of which is undergoing vaporization, a tank having a pair of headers spaced respectively from the top and bottom thereof and forming an upper chamber, a lower chamber and an intermediate chamber, a plurality of tubes extending between the headers through the intermediate chamber and having their interiors communicating with the upper and lower chambers, a plurality of vertically spaced trays arranged within the intermediate chamber and having outlets for distributing the liquid to be vaporized onto the exterior surfaces of said tubes, means for maintaining a pool of liquid to be vaporized upon each tray, means for withdrawing the vaporized liquid from the intermediate chamber, means associated with the upper end of each of the tubes in the upper chamber for discharging a thin annular stream of liquid onto the interior surface of each tube, means for supplying liquid to said chamber, and means for withdrawing said liquid from the lower chamber.

7. In an apparatus for interchanging heat between two liquids one of which is undergoing vaporization, a tank having a pair of headers spaced respectively from the top and bottom thereof and forming an upper chamber, a lower chamber and an intermediate chamber, a plurality of vertical tubes extending between the headers through the intermediate chamber and having their interiors communicating with the upper and lower chambers, a plurality of vertically spaced trays arranged within the intermediate chamber and having outlets for distributing liquid to be vaporized to the exterior surfaces of the tubes, said trays having means for delivering liquid to be vaporized from one tray to the next lower tray, means for supplying an excess of liquid to be vaporized to an upper tray, means for returning liquid remaining unvaporized from the bottom of the intermediate chamber to an upper tray therein, means for withdrawing vaporized liquid from the intermediate chamber, means associated with the upper ends of the tubes within the upper chamber for discharging a thin annular stream of liquid onto the interior surface of each tube, means for supplying liquid to said chamber, and means for withdrawing said liquid from the lower chamber.

8. In heat exchange apparatus employing upright tubes, substantially cone-shaped liquid distributing members positioned in the upper end portions of said tubes.

9. In heat exchange apparatus employing upright tubes, apertured cap members positioned adjacent the upper ends of said tubes, and liquid distributing members depending from said cap members and extending into the upper end portions of said tubes.

10. In heat exchange apparatus employing upright tubes, cap members having substantially centrally disposed apertures therein positioned adjacent the upper ends of said tubes, and substantially cone-shaped liquid distributing members positioned below said cap members substantially concentric with the apertures in said cap members.

In testimony whereof I affix my signature.

CHARLES LALOR BURDICK.